United States Patent [19]
Ishita

[11] Patent Number: 4,916,451
[45] Date of Patent: Apr. 10, 1990

[54] MICROWAVE LANDING SYSTEM

[75] Inventor: Toru Ishita, Tokyo, Japan

[73] Assignee: NEC Corporation, Tokyo, Japan

[21] Appl. No.: 130,200

[22] Filed: Dec. 8, 1987

[30] Foreign Application Priority Data

Dec. 8, 1986 [JP] Japan .................. 61-293138

[51] Int. Cl.⁴ .............................................. G01S 7/40
[52] U.S. Cl. ........................................ 342/35; 342/173
[58] Field of Search .................. 342/35, 33, 34, 165, 342/173, 174, 368, 371, 372

[56] References Cited

U.S. PATENT DOCUMENTS

| | | | |
|---|---|---|---|
| 4,138,678 | 2/1979 | Kirner | 342/173 |
| 4,145,692 | 3/1979 | Armstrong et al. | 342/173 |
| 4,283,725 | 8/1981 | Chisholm | 342/174 |
| 4,333,081 | 6/1982 | Höfgen | 342/407 |
| 4,532,517 | 7/1985 | LaBerge et al. | 342/372 |
| 4,590,477 | 5/1986 | Regnier et al. | 342/173 |
| 4,639,732 | 1/1987 | Acoraci et al. | 342/371 |
| 4,700,192 | 10/1987 | Zezuto et al. | 342/173 |
| 4,724,440 | 2/1988 | Lopez et al. | 342/368 |

Primary Examiner—Thomas H. Tarcza
Assistant Examiner—John B. Sotomayor
Attorney, Agent, or Firm—Foley & Lardner, Schwartz, Jeffery, Schwaab, Mack, Blumenthal & Evans

[57] ABSTRACT

Field monitor antenna is located to receive reciprocally scanned guidance beams. A pair of test pulses having a time interval which is determined by the field monitor antenna location are generated from a test pulse generator during a dead time period of the guidance beam scanning. TO-pulse and FRO-pulse pulses in response to the guidance beams and those of the pair test pulses are supplied to a monitor. The monitor measures a first and a second time interval between the TO-pulse and the FRO-pulse of the signals from the test pulse generator and from the field monitor antenna. Monitor verification means verifies the normalcy of the monitor on the basis of the measured first time interval and verifies the normalcy of the guidance beam on the basis of the measured second time interval.

21 Claims, 7 Drawing Sheets

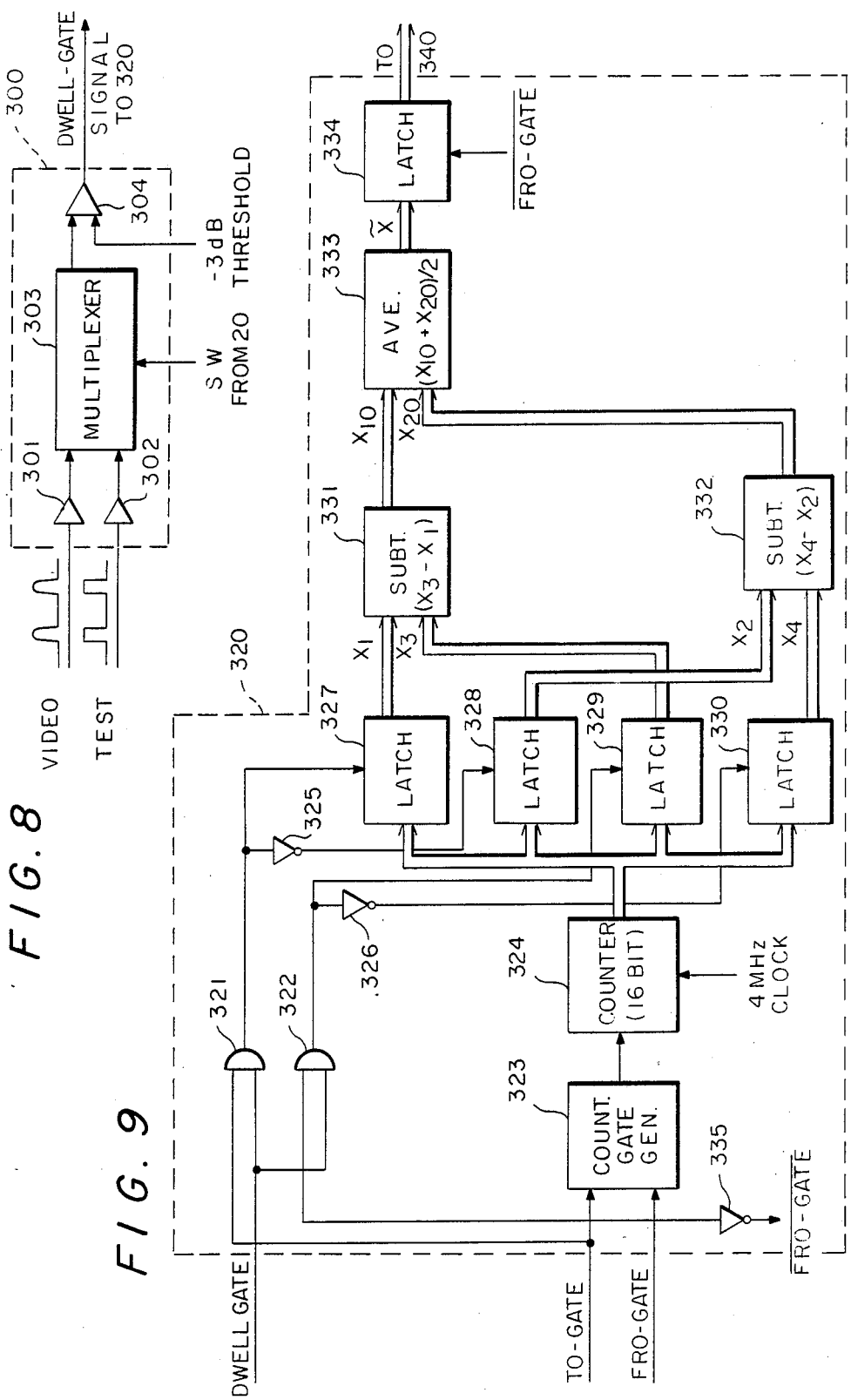

MICROWAVE LANDING SYSTEM

BACKGROUND OF THE INVENTION

The present invention relates to a microwave landing system (hereinafter abbreviated the "MLS system"), and more particularly to a monitor verification apparatus of an MLS system and a method thereof which verifies the normalcy of a monitor function that monitors the radiation normalcy of predetermined microwave beams from a ground station to an aircraft in space.

MLS systems which guide landing aircraft by using microwaves have recently become well known. Such an MLS system has a monitoring function of the microwave beams radiated from the ground station to the aircraft to guide the aircraft, to see whether or not the radiation is normal. The system also has a monitor verification function which checks the monitor function itself to verify its normalcy, so as to improve the system integrity.

In the conventional monitor verification system, a test signal, for verifying the normalcy of the monitor circuit, is supplied to the monitor circuit in response to the positioning of a switch by the operator. Namely, the monitor function is verified by supplying the test signal to the monitor verification circuit only when the operator manually operates the switch to verify the monitor function. As a result, the function of the monitor verification circuit itself of monitoring guidance microwave beams which are actually being radiated into space is interrupted during the monitor function verification period. This inevitably leads to a great reduction in the integrity required for the operation of an MLS system.

SUMMARY OF THE INVENTION

An object of the present invention is to provide an MLS system capable of verification operation of the monitor function without interrupting the monitor function.

Another object of the present invention is to provide an MLS system capable of verifying the monitor function in real time.

Still another object of the present invention is to provide an MLS system with greatly improved the integrity.

According to the present invention, there is provided a microwave landing system comprising: scan means for reciprocally scanning a predetermined region with a guidance beam; a field monitor antenna located at a predetermined position for receiving the guidance beam; conversion means for converting a signal received by the field monitor antenna into a video signal; test signal generator means for generating as a test signal paired pulses having a TO-pulse and a FRO-pulse with a first time interval therebetween, which is outside a predetermined tolerance range based on a second time interval between a TO-pulse and a FRO-pulse received by the field monitor antenna during a TO-scan and a FRO-scan of the guidance beam; switch means for outputting the video signal from the conversion means and the paired pulses from the test signal generator means during a dead time period during which the field monitor antenna receives no electromagnetic waves indicative of meaningful information for guidance; measurement means for measuring, on the basis of the output of the switch means, the second time interval between the TO-pulse and the FRO-pulse, and the first time interval; and verification means for verifying the normalcy of the system on the basis of the second time interval obtained by the measurement means and for verifying the normalcy of a monitor circuit including the field monitor antenna, the switch means, and the measurement means on the basis of the first time interval.

Other objects and features of the present invention will be clarified from the following description with reference to the drawings.

BRIEF DESCRIPTION OF THE DRAWINGS

FIG. 8 is a block diagram showing details of an analog switch circuit 300 shown in FIG. 3;

FIG. 9 is a block diagram showing an example of a detailed arrangement of an angle decoder 320 shown in FIG. 5;

PREFERRED EMBODIMENTS OF THE INVENTION

Figure 1:
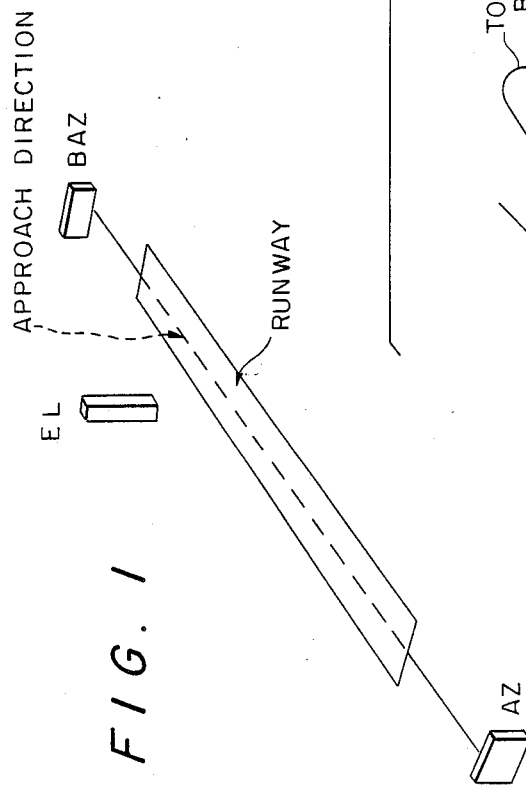
FIG. 1 is a view schematically showing an MLS system configuration.

Referring to FIG. 1, an MLS system uses electromagnetic waves (microwaves) in the 5-GHz band and includes guidance subsystems such as an azimuth subsystem (hereinafter abbreviated as the "AZ subsystem"), an elevation subsystem (hereinafter abbreviated as the "EL subsystem"), and a back azimuth subsystem (hereinafter abbreviated as the "BAZ subsystem").

The AZ and EL subsystems radiate scanning microwave beams toward the aircraft approaching a runway to guide the aircraft in the azimuthal and elevational directions, respectively. The BAZ subsystem is disposed on the end of the runway opposite the AZ subsystem and radiates a microwave beam in the direction opposite to that in which the aircraft is approaching, so that the aircraft can be guided when it has to approach again, i.e., if it has to make a second landing attempt.

These microwave beams from a transmitter 11 are radiated into space through a group of beam scanning antennas 12 which comprise antennas associated with the AZ, EL, and BAZ subsystems. Scanning beams obtained from the group of beam scanning antennas are described below in detail.

An azimuthal guidance microwave beam from the AZ or BAZ subsystem is narrow in the horizontal plane but wide in the vertical plane. On the other hand, an elevational guidance microwave beam from the EL subsystem is wide in the horizontal plane but narrow in the vertical plane. Each of these beams repeats reciprocal scanning movements, and the aircraft determines its approach angle on the basis of the time intervals between pairs of pulses received in the TO-scan and the FRO-scan.

Figure 2:
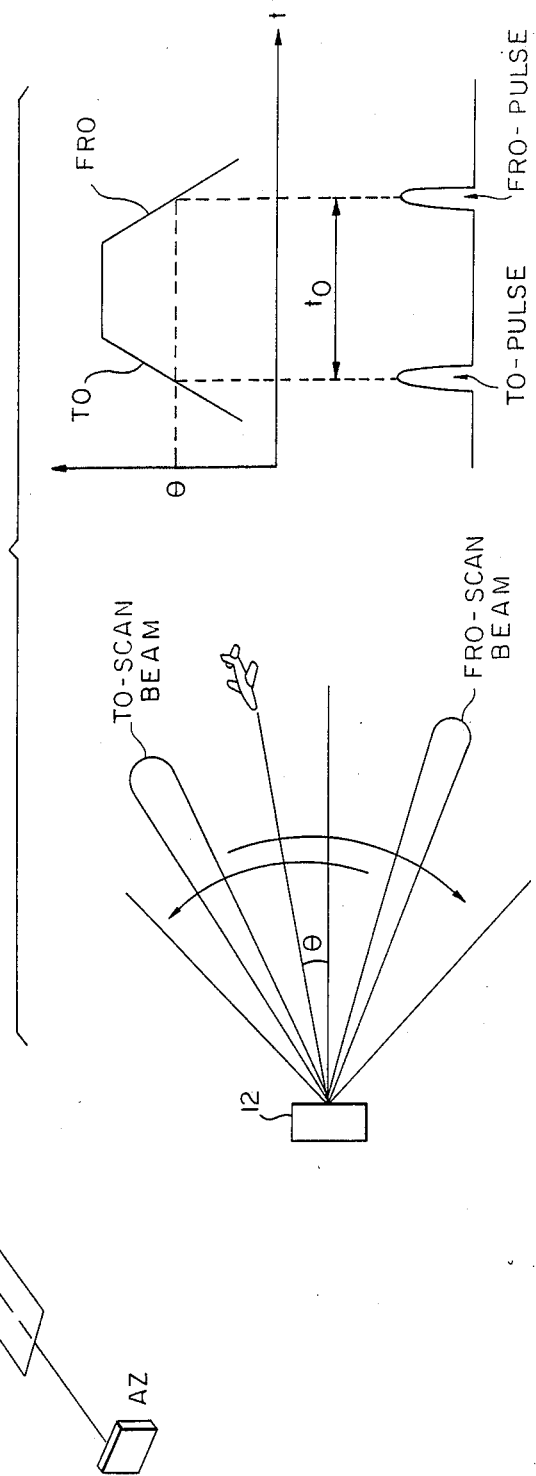
FIG. 2 is a view illustrating the principle of measuring the approach angle of an aircraft.

FIG. 2 is a view illustrating the principle of measuring the approach angle of the aircraft. The explanation will be given concerning the azimuthal guidance microwave beam, by way of example. A TO-scan pulse, or TO-pulse, and a FRO-scan pulse, or FRO-pulse, are obtained from the TO-scan beam and the FRO-scan beam, respectively, and are received by the aircraft. Therefore, the azimuthal approach angle $\theta$ can be calculated from the time interval $t_0$ between a pair of these pulses.

Figure 3:
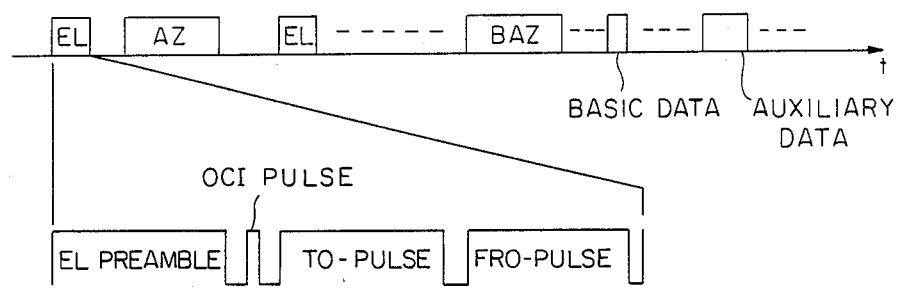
FIG. 3 is a view illustrating an arrangement of microwave guidance waves.

Microwave beams radiated from the AZ, EL, and BAZ guidance subsystems are output as time-series data, as shown in FIG. 3. In addition, each of these microwaves contains necessary data which are arranged in a time-division multiplexed form. For instance, each elevational (EL) guidance beam contains, in the time-division multiplexed form, pulses such as a preamble enabling the aircraft to identify the subsystem, an OCI pulse indicating the outside of the relevant region, a TO-pulse, and a FRO-pulse. The MLS system also transmits, in addition to these guidance microwaves, information on factors such as the guidance region and the antenna beam width, as basic data and auxiliary data.

Although an MLS system measures the approach angle based on the above-described principle, aircraft are not provided with any means for verifying the normalcy of the received signals. Therefore, the MLS system checks predetermined items relating to possible abnormalities in the radiated beam which may lead to erroneous operation, and transfers the transmission system to a normal auxiliary (backup) system or shuts down the transmission when the erroneous operation is discovered. In this case, the monitor function monitors the transmission of the guidance beam to determine whether or not transmission is normal.

However, if the monitor function circuit has a failure in its monitoring function, it may not perform correctly even if it is still able to perform the monitoring. A monitor verification circuit is provided to solve this problem.

Figure 4A:
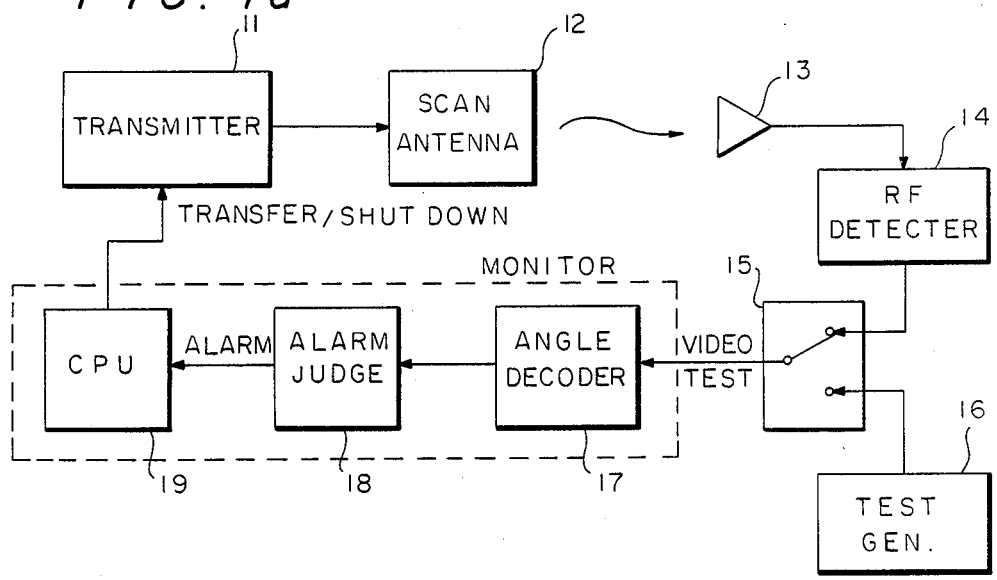
FIG. 4A is a block diagram showing the arrangement of conventional monitor and monitor verification circuits.

The conventional circuit shown in FIG. 4A has a transmitter 11, a group of beam scanning antennas 12, a field monitor antenna 13, an RF detector 14, a switch 15, a test signal generator 16, and a monitor section comprising an angle decoder 17, an alarm judgment circuit 18, and a central processing unit (CPU) 19.

The field monitor antenna 13 is located at a predetermined position for receiving the guidance microwave beams radiated through the group of beam scanning antennas 12. The output of the field monitor antenna 13 is supplied to the RF detector 14.

The RF detector 14 detects this input and converts it into a video signal which is supplied to the monitor section through the switch 15. The switch 15 is normally connected to the output of the RF detector 14.

In the monitor section, the angle decoder 17, to which the video signal has been input, measures each time interval $t_0$ between the TO-pulse and the FRO-pulse of the video signal, and calculates the approach angle of the aircraft with respect to both azimuth ad elevation. Further, the angle decoder 17 determines whether or not the thus calculated approach angle is within an allowable tolerance range and supplies the determination result to the alarm judgment circuit 18. The allowable tolerance range used in this determination has previously been set in accordance with the operating conditions of that MLS system.

The alarm judgment circuit 18 monitors and judges the normalcy by checking whether the calculated approach angle is outside the allowable tolerance range and, if it is, i.e., abnormal, whether or not the abnormal condition continues for a time period longer than a predetermined value of, for instance, 1 second which is set in accordance with the International Standards. If the alarm judgment circuit 18 judges that the abnormal condition continues for more than the predetermined time period, the alarm judgment circuit 18 outputs an alarm signal to the CPU 19.

In response to the alarm signal, the CPU 19 generates a transfer/shut-down signal which specifies either the transfer of the transmission from the transmitter 11 to the auxiliary system under a stored program control or the shut-down, i.e., stopping, of the transmitter 11, thereby ensuring the integrity of the MLS system.

Hitherto, the normalcy verification of this monitor function has been effected in the following manner.

The operator operates the switch 15 to supply the test signal from the test signal generator 16 to the monitor section to correctly detect any abnormality in the transmission of a guidance beam. The test signal contains a TO-pulse and a FRO-pulse with a time interval outside the allowable tolerance range. When the test signal is supplied to the monitor section through the switch 15, the alarm signal is generated after a predetermined time period, i.e., after 1 second in the above-mentioned example, and the transfer/shut-down signal is supplied from the CPU 19 to the transmitter 11. If no alarm signal is generated within the predetermined time period, e.g., 1 second, after the switch 15 has been operated to supply test signals to the monitor section, it is determined that the monitor circuit itself is faulty, and the transfer/shut-down process is executed in a manner different from that described above.

Figure 4B:
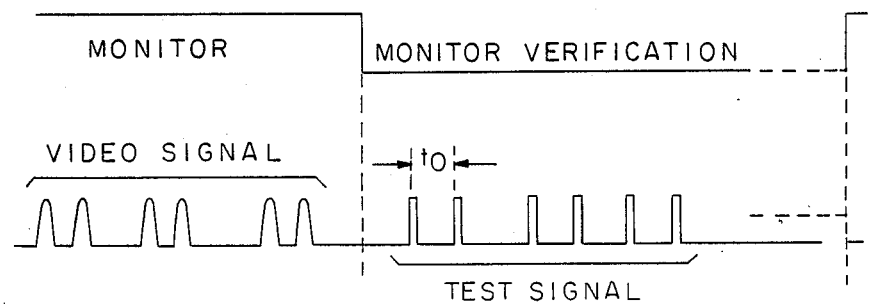
FIG. 4B is a timing chart illustrating a monitor verification operation performed with the conventional circuits shown in FIG. 4A.

This is the conventional monitor verification system. The conventional system, however, encounters the problem that the monitor function is not executed during the time period in which the switch 15 is switched to the such position which allows the test signal to be supplied since the output of the RF detector 14 is not being supplied to the monitor section. The conventional system also encounters the problem that a monitor verification operation can be performed only when the switch 15 has been switched to the above-mentioned position. This is clearly seen from FIG. 4B. The monitor verification operation is usually performed by the operator at the periodic inspection time. Since this periodic inspection is performed once in a certain period of times such as a day, a week, or a month, there is a fear that any failure in the monitor circuit may be left undetected for a long period of time.

Figure 5:
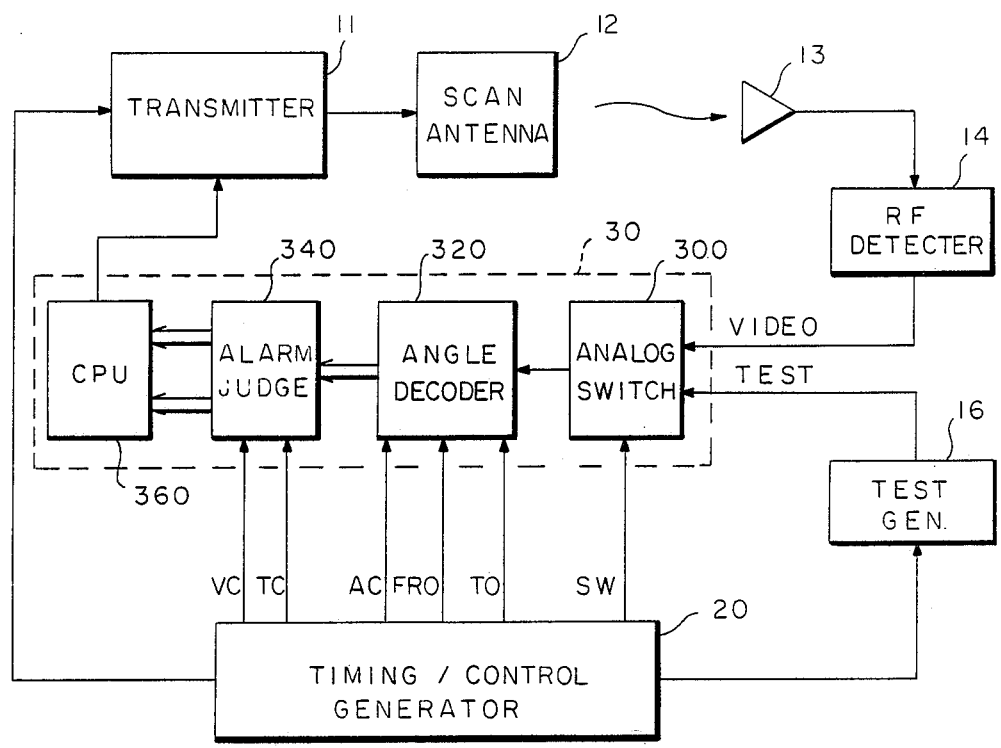
FIG. 5 is a block diagram showing an embodiment of the present invention.

FIG. 5 illustrates a block diagram which solves the above-stated problems in accordance with an embodiment of the present invention. Components designated by the same reference numerals as those shown in FIG. 4A correspond to the respective components shown in FIG. 4A, and detailed description of these components will be omitted.

Descriptions will be given concerning guidance microwave beams radiated by the elevational (EL) guidance subsystem, by way of example. In the following example, an elevational angle indicated by each signal received by a field monitor antenna 13 is monitored and the angle's accuracy is determined.

The transmitter 11 transmits electromagnetic waves (microwave beam) through the corresponding beam scanning antenna 12 to guide the aircraft, for instance, in the elevational direction. This transmission is controlled by a transmission control signal TC (see FIG. 6) fed from a timing/control signal generator 20. In the actual transmission, devices (not shown) including an antenna switch are used to supply power to an OCI antenna and a data antenna; however, for the sake of simplifying the descriptions, it is assumed here that the transmitting antenna implies the group of beam scanning antennas 12.

The beam scanning antenna 12 scans a predetermined region with the microwave beam with predetermined timing. The field monitor antenna 13 receives the TO-pulse and FRO-pulse of the beam and supplies these pulses to the RF detector 14. The RF detector 14 converts the TO- and FRO-pulses into video signals and supplies the resulting video signals to a monitor section 30.

Figure 6:
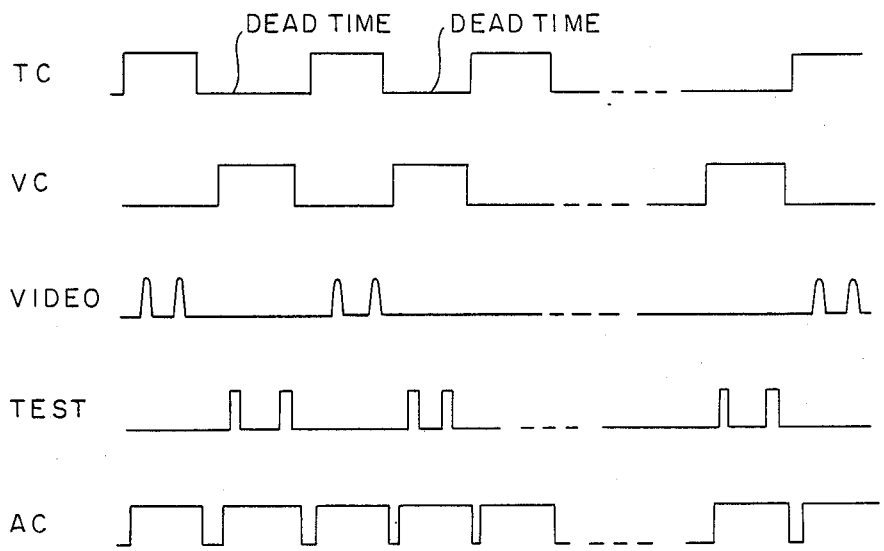
FIG. 6 is a timing chart showing the main signals of FIG. 5.

FIG. 6 is a timing chart of main signals in the embodiment shown in FIG. 5. As shown in FIG. 6, each of the video signals (VIDEO) comprises paired pulses consisting of a TO-pulse and a FRO-pulse. These paired pulses are output in response to the above-described transmission control signal TC. The period during which the transmission control signal TC is indicating the low level is called a dead time period.

As stated before, the MLS system also transmits, in addition to the guidance information transmitted by the AZ, EL, and BAZ subsystems, basic data such as information on the azimuth-proportional guidance region and the scanning beam width and auxiliary data such as weather data required for aircraft. Since these various data items are transmitted at the same frequency, it is necessary to avoid interference between waves. For this purpose, the data items are transmitted in a time-division multiplexed form as shown in FIG. 3. More specifically, the data items are arranged within one period of 615 msec at random to a certain extent. Further, with respect to a single data item, the components of the data are also transmitted in a time-division multiplexed form. The dead time period is a time period during which none of these data are being transmitted.

The timing/control signal generator 20 also generates a test (verification) signal control pulse signal VC as shown in FIG. 6. The test signal generator 16 generates and supplies a test signal, in response to the control signal VC, to the monitor section 30.

In the monitor section 30, the video signal from the RF detector 14 and the test signal from the test signal generator 16 are received by an analog switch circuit 300. The analog switch circuit 300 is automatically switched by an analog switching signal SW, from the timing/control signal generator 20, to supply these two received signals to an angle decoder 320.

The analog switching signal SW is generated in response to the control signal VC and is used as a gate signal to the analog switch circuit 300, whereby the test signal is applied to the angle decoder 320 during the dead time periods.

The timing/control signal generator 20 also supplies an angle decoder control signal AC shown in FIG. 6 to the angle decoder 320. This control signal AC specifies the timing of the actual video signal and that of the monitor verification operation. The angle decoder 320 operates in response to the control signal AC to measure the time interval between the TO-pulse and FRO-pulse of the video or test signal input thereto for either a monitor operation or a monitor verification operation, by calculating the approach angle. This operation is described in detail below.

Figure 7A:
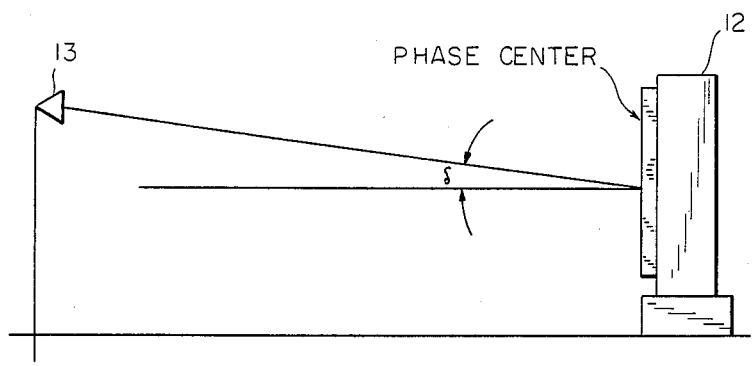
FIG. 7A is a view schematically illustrating the positional relationship between an EL beam scanning antenna and a field monitor antenna.

FIG. 7A illustrates the positional relationship between the EL beam scanning antenna 12 and the field monitor antenna 13. The elevational angle $\delta$ is defined by an elevational angle formed between two lines both of which pass through the phase center of the EL beam scanning antenna 12 and one of which passes through the field monitor antenna 13.

Figure 7B:
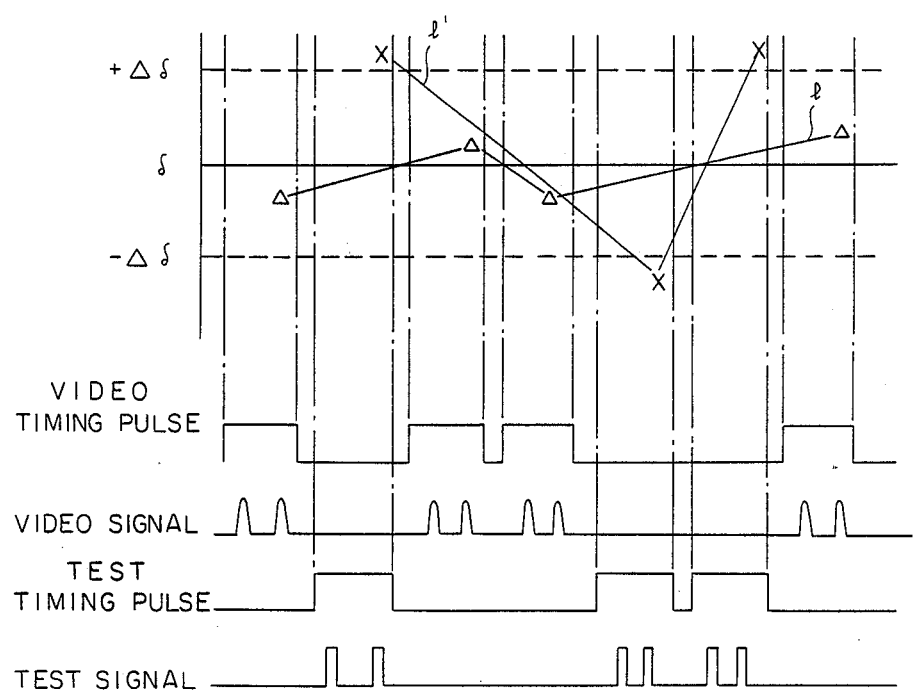
FIG. 7B is a view used in explanation of monitor and monitor verification operations performed with the positional relationship shown in FIG. 7A.

Referring to FIG. 7A, when the MLS system is operating normally, the angle value $\delta$ usually varies within an allowable tolerance range between the upper limit $(\delta + \Delta\delta)$ and the lower limit $(\delta - \Delta\delta)$, as indicated by a normal variation characteristic curve 1. These angle values are each obtained from each of the video signals supplied to the monitor section 30 for monitoring them at timing points corresponding to the video signal timing pulses shown in FIG. 7B. On the other hand, the test signals are each input to the monitor section 30 for the monitor verification at timing points corresponding to test signal timing pulses also shown in FIG. 7B. The angle decoder 320 measures the time interval between the TO- and FRO- pulses of each of these signals so as to obtain the angle value $\delta$ on the basis of the signals received through the analog switch circuit 300. The time interval between the TO- and FRO- pulses of the test signal has previously been set to a value which is outside the allowable tolerance range. Therefore, if the angle decoder 320 is operating normally, the measured value exceeds the upper or lower limits $\delta + \Delta\delta$ and $\delta - \Delta\delta$, as indicated by a test signal variation characteristic curve 1'. The above-mentioned video signal timing pulses and test signal timing pulses basically correspond to the transmission control signal TC and the test signal control pulse signal VC shown in FIG. 6, respectively. The angle $\delta$ obtained by the angle decoder 320 is supplied to an alarm judge circuit 340.

The alarm judge circuit 340 monitors for such an abnormality and determines whether or not the abnormality continues for a period longer than 1 second. If it does continue, the alarm judge circuit 340 outputs an alarm signal to a CPU 360. The alarm judge circuit 340 also receives the transmission control signal TC and the test signal control pulse signal VC from the timing/control signal generator 20, and determines whether the abnormality is attributable to the EL guidance microwave beams actually being radiated into space or whether it is attributable to the monitor verification operation, using the test signal based on the control signals. The operation of the monitor section 30 is determined to be normal if the alarm signal is generated in response to the test signal. Conversely, if no alarm signal is generated, it is determined that the monitor function of the monitor section 30 is abnormal. The determination result is provided to the CPU 360.

The CPU 360 is supplied with the results of monitor and monitor verification with respect to not only the measured angle but also the other parameters required, and, when any abnormality is detected in the components from these results, the CPU 360 outputs the transfer/ shut-down signal to the transmitter 11.

Although the foregoing descriptions are given concerning monitoring the elevational angle accuracy, by way of example, it is to be understood that verification of the monitoring with respect to any other parameter can be effected in a similar manner.

FIG. 8 is a block diagram showing details of the analog switch circuit 300 shown in FIG. 5.

Figure 10:
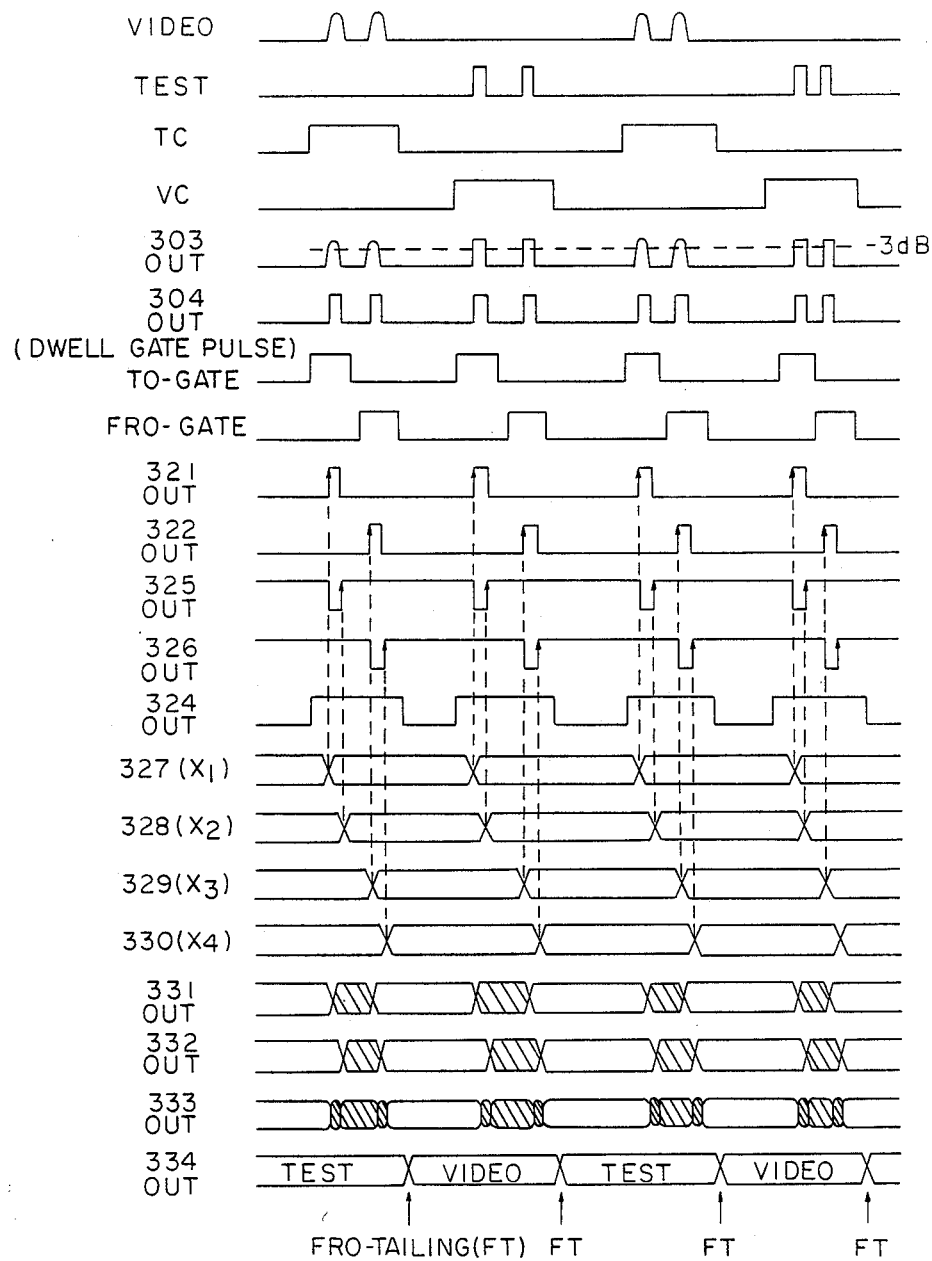
FIG. 10 is a timing chart used in explanation of the operation of the decoder shown in FIG. 9.

The video signal detected by the RF detector 14 and the test signal generated by the test signal generator 16 in a dead time period are respectively supplied to amplifiers 301 and 302 to be amplified thereby. The amplifiers 301 and 302 each comprise a differential amplifier for removing noise due to in-phase components. A multiplexer 303 has the function of an analog switch and outputs, in response to a switching signal SW from the timing/control signal generator 20, a video signal and a test signal alternatively. The switching signal SW may comprise either the transmission control signal TC or the test signal control pulse signal VC. If the control signal TC is used as the switching signal SW, the arrangement should be such that, when the signal SW is at the high level, the video signal is passed, while, when it is at the low level, the test signal is passed. On the other hand, if the control signal VC is used as the signal SW, the arrangement should be the reverse of what is mentioned above. In this way, at the output of the multiplexer 303, the video signal obtained from the field monitor antenna 13 and the test signal generated by the test signal generator 16 appear as time-series signals, as shown in FIG. 10. The output of the multiplexer 303 is then supplied to one input terminal of an analog comparator 304. The other input terminal of the comparator 304 is supplied with a voltage smaller than the peak value of the video signal from the past scanning by −3 dB. The comparator 304 compares the output of the multiplexer 303 with the −3 dB threshold level indicated by the broken line in FIG. 10. The comparator 304 outputs time-serial pulses which are supplied as dwell gate pulses to the angle decoder 320.

FIG. 9 is a block diagram showing an example of a detailed arrangement of the angle decoder 320. The timing/control signal generator 20 supplies a TO-gate pulse and a FRO-gate pulse to AND gates 321 and 322 and to a counter gate generator 323 in the angle decoder 320. As shown in FIG. 10, the TO-gate and the FRO-gate pulses each have a suitable timing and width for enabling the extraction of TO- and FRO- pulses of the video signal and the test signal. Each of these gate pulses has a timing and a width or duration, which are determined in accordance with the position at which the corresponding field monitor antenna 13 is located. On the other hand, the test signal comprises a TO-pulse and a FRO-pulse with the interval therebetween being set to a value which is slightly outside the allowable tolerance range of the approach angle, as will be described later in detail.

The input terminals of the AND gates 321 and 322 are supplied with a TO-gate pulse and a FRO-gate pulse, respectively, while the other input terminals of AND gates 321 and 322 are supplied with the dwell gate pulse from the analog switch 300. Therefore, the AND gates 321 and 322 separate and extract the TO-pulses and the FRO-pulses from the pulses of the dwell gate signal.

The counter gate signal generator 323 generates a pulse which rises at the leading edge of the TO-gate pulse and falls at the trailing edge of the FRO-gate pulse and supplies it as a counter gate signal to a counter 324. Accordingly, the counter 324 starts counting at the leading edge of the TO-gate pulse and terminates the counting at the trailing edge of the adjacent FRO-gate pulse. The output of the counter 324 is supplied to D-latches 327 to 330. As shown in FIG. 10, the D-latch 327 latches the output of the counter 324 at the rise of the AND gate 321 output. The value X1 latched by the D-latch 327 indicates the counter value at the detection time of the TO-pulse, i.e., its rising position or time point. The D-latch 328 latches the output of the counter 324 at the rise of a pulse obtained by inverting the output of the AND gate 321 by an inverter 325. The thus latched counter value X2 indicates the falling position of the TO-pulse. Similarly, the D-latch 329 latches a counter value X3 of the counter 324 which indicates the rising position of the FRO-pulse on the basis of the output of the AND gate 322. The D-latch 330 latches the output of the counter 324 at the rise of a pulse obtained by inverting the output of the AND gate 322 by an inverter 326, so as to latch therein a counter value X4 which indicates the falling position (or time point) of the FRO-pulse.

A subtracter 331 receives the counter values X1 and X3 from the latches 327 and 329 and calculates a difference $X10=(X3-X1)$, that is, a time interval from the rise of the TO-pulse to the rise of the FRO-pulse. Similarly, another subtracter 332 receives the counter values X2 and X4 from the latches 328 and 330 and calculates a difference $X20=(X4-X2)$, that is, the time interval from the fall of the TO-pulse to the fall of the FRO-pulse. An averaging circuit 333 calculates the average $X=(X10-X20)/2$ from the difference values X10 and X20 output from the subtracters 331 and 332, thereby obtaining a value of $t_0$ shown in FIG. 2, that is, the time interval between the centers of the TO- and FRO-pulses. The thus obtained average value is latched by a D-latch 334. More specifically, the latch 334 latches the average value at the rise of a pulse obtained by inverting each FRO-gate pulse by an inverter 335. This means that the calculation result by the angle decoder 320 can be fed to the alarm judgment circuit 340 after the completion of the processing by the angle decoder 320 has been detected from the trailing edge of the FRO-gate pulse. In this way, the angle decoder 320 successively calculates the time intervals between TO-pulses and FRO-pulses of the successively-input video signal and test signal, the latter being used for the monitor verification, and successively outputs the calculation results to the alarm judgment circuit 340.

Figure 11:
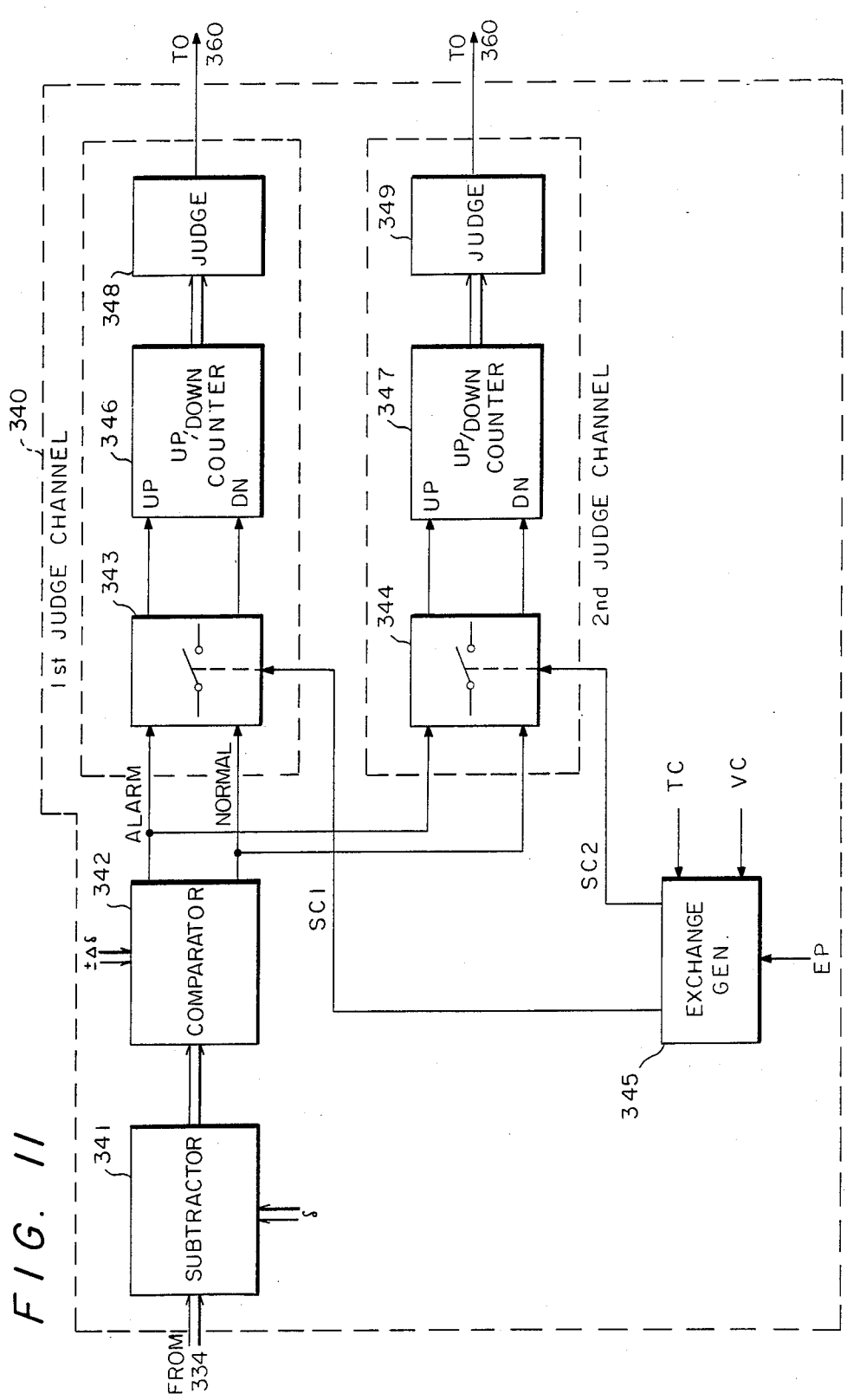
FIG. 11 is a block diagram showing an example of a detailed arrangement of an alarm judgment circuit 340 shown in FIG. 5.

FIG. 11 is a block diagram illustrating a detailed arrangement of the alarm judgment circuit 340. The time interval between TO- and FRO- pulses of the video signal and the test signal, which has thus been obtained by the angle decoder 320, are input to a subtracter 341 of the circuit 340 wherein the value of a reference data is subtracted from the time interval value. In this case, the reference data is a data corresponding to the angle δ shown in FIG. 7A, which is the elevation angle of the phase center of the field monitor antenna which is optically measured from the phase center of the beam scanning antenna. Thus, this angle is regarded as the true value δ and is subtracted, by the subtracter 341, from the time interval obtained by the angle decoder 320, thereby detecting measurement error.

A comparator 342 then determines whether or not the thus obtained measurement value is within an allowable tolerance range (i.e., the true value $\delta \pm \Delta\delta$), whereby data concerning whether or not the measurement value is within the allowable tolerance range are obtained for the video signal and for the test signal, which are used for the normalcy verification of the monitor circuit operation. These data are then supplied to the alarm judgment circuits.

According to this embodiment, the time interval between TO- and FRO- pulses of the test signal is set at a value slightly outside the allowable tolerance range ($\delta \pm \Delta\delta$). In other words, a signal which, so long as the monitor circuit is operating normally, results in a comparison result "alarm" is used as the test signal. This enables detection of an abnormality even when the allowable tolerance range becomes wider due to malfunction of various components. The comparator 342 generates the comparison result which is, for instance in the order illustrated in FIG. 7B, "normal", "alarm", "normal", etc. It should be clearly noted that these "normal"/"alarm" comparison results merely show whether or not the interval values are within the allowable tolerance range, and that they do not show any direct determination concerning normalcy/ abnormality of the devices and circuits.

The "alarm" output of the comparator 342 (which is generated when the measurement angle error is more than $\pm \Delta\delta$) and the "normal" output therefrom (which is generated when the error is within a range of $\pm \Delta\delta$) are fed to up and down (DN) terminals of up/down counters 346 and 347 via switches 343 and 344. The switches 343 and 344 are respectively controlled by switch control signals SC1 and SC2 generated from an exchanging control signal generator 345. The control signal generator 345 outputs the transmission control signal TC and the test signal control signal VC, shown in FIG. 10, as the switch control signals SC1 and SC2 alternately in accordance with an exchange pulse signal EP which is input at predetermined time intervals. In this example, the generator 345 supplies the transmission control signal TC to the switch 343 as the control signal SC1 when the exchange pulse signal EP is at the low level. Thus the comparison result corresponding to the video signal is extracted from the output of the comparator 342 and is sent to the up/down counter 346. Similarly, the test control signal VC is supplied to the switch 344 as the control signal SC2, so that the comparison result corresponding to the test signal is extracted from the output of the comparator 342 and is sent to the up/down counter 347.

Conversely, when the exchange pulse signal EP is at the high level, the test control signal VC and the transmission control signal TC are supplied as the SC1 and SC2 control signals, to the switches 343 and 344, respectively. Under this condition, the comparison result for the test signal is sent to the counter 346 while the comparison result for the video signal is sent to the counter 347. In this way, the switches 343 and 344 operate in response to the control signals SC1 and SC2 to separate the comparison results of the video signal from the comparison results of the test signal and also operate under the control of the exchange pulse signal EP to interchange channels which execute determination processing periodically, that is, a first judgment channel including the counter 346 and a second judgment channel including the counter 347.

The operations of these channels will now be explained. When the exchange pulse signal EP is at the low level, the first judgment channel performs the video signal processing while the second judgment channel performs the test signal processing. If the video signal, i.e., the transmission signal, is normal, the measurement angle error is within the the allowable range, so that the input to the DN (down) terminal of the counter 346 becomes "ON", thereby decrementing the counter value. The counter is adjusted in such a manner that its value never becomes less than "0".

If an abnormality occurs in the transmission, an "alarm" signal indicating that the measurement angle error is outside the allowable range, is fed to the first judgment channel. In this case, the input to the UP (up) terminal of the counter 346 becomes "ON", thereby incrementing the counter value. When the counter value in the counter 346 exceeds a certain alarm limit thereof, the output of a judgment circuit 348 becomes high, and the counter value is reset. The judgment circuit 348 has a comparison function and generates a high level signal when the counter value has reached the alarm limit number corresponding to a time period which is, for instance, about 1 second.

Meanwhile, the second judgment channel is supplied with the comparison result for the test signal. If the monitor circuit is normal, the result is fed to the UP terminal of the counter 347 via the switch 344 for the incrementation. Therefore, a judgment circuit 349 generates, after a time interval of about 1 second, a high level signal corresponding to the alarm signal. On the other hand, when no alarm signal is generated, that is, when the monitor circuit fails to determine that the time interval between the TO- and FRO- pulses of the test signal is outside the allowable tolerable range, the judgment circuit 349 generates a low level signal.

Conversely, when the exchange pulse signal EP is at the high level, the processing performed by the first and second judgment channels is reversed with respect to the video and test signals, and, accordingly, the output signals from the channels will be such that, if both the transmission and the monitor circuit are normal, the output of the judgment circuit 348 becomes high and the output of the judgment circuit 349 becomes low.

When the signal EP is high and if the outputs of the judgment circuit 348 and 349 are different from the combination mentioned above, it is determined that the devices and circuit are abnormal and the CPU 360 outputs a transfer/shut-down signal. More specifically, the CPU 360 determines an abnormality in the monitor circuit on the basis of the exchange pulse signal EP and outputs of the judgment circuits 348 and 349.

In this way, according to this example, two judgment channels are provided, and these channels are alternately supplied with comparison results indicating whether or not the measurement angle error for the video signal or the test signal is within the allowable tolerance range. This provides the verification of the monitor circuit with an increased level of reliability.

What is claimed is:

1. A microwave landing system for use in radiating a guidance beam, said microwave landing system comprising:

scan means for reciprocally scanning a predetermined region with said guidance beam;

a field monitor antenna located at a predetermined position for receiving said guidance beam at said predetermined position;

conversion means for converting a signal received by said field monitor antenna into a video signal;

test signal generator means for generating a test signal which has paired pulses including a TO-pulse and FRO-pulse with a first time interval therebetween which is outside a predetermined tolerance range based on a second time interval between a TO-pulse and a FRO-pulse received by said field monitor antenna during a TO-scan and a FRO-scan of said guidance beam;

a monitoring circuit, coupled to said conversion means and to said test signal generator means, to monitor normalcy of said microwave landing system, said monitoring circuit including;

switch means, coupled to said conversion means and to said test signal generator means, for outputting said paired pulses from said test signal generator means during a dead time period during which said field monitor antenna receives no electromagnetic waves indicative of meaningful information for guidance;

measurement means for measuring, on the basis of an output of said switch means, an second time interval and said first time interval; and verification means for verifying said normalcy of said microwave landing system on the basis of a measured second time interval and for verifying a normalcy of said monitoring circuit on a basis of the measured first time interval.

2. A microwave landing system according to claim 1, further comprising timer means for determining that said verification means has detected an abnormality in said system or said monitor circuit over a time period greater than a predetermined time period.

3. A microwave landing system according to claim 2, further comprising means for stopping said microwave landing system when said timer means determines that said abnormality has been detected over a time period greater than said predetermined time period.

4. A microwave landing system according to claim 2, further comprising means for transferring the operation of said microwave landing system to a different system when said timer means determines that said abnormality has been detected over a time period greater than said predetermined time period.

5. A microwave landing system according to claim 1, wherein said scan means scans in the elevational or azimuthal directions.

6. A microwave landing system according to claim 1, wherein said test signal generating means generates paired pulses with the first time interval which is slightly outside said predetermined tolerance range.

7. A microwave landing system according to claim 1, wherein said test signal generating means alternately generates paired pulses with the first time interval longer than a reference time interval determined by the located position of said field monitor antenna, and paired pulses with the first time interval shorter than said reference time interval.

8. A microwave landing system according to claim 1, wherein said measurement means comprises:

a counter which starts counting at the leading edge of a TO-gate pulse, including the TO-pulse of said guidance beam or said test signal, and terminates the counting at the trailing edge of a FRO-gate pulse, including the corresponding FRO-pulse of said guidance beam of said test signal;

a first latch which latches a counter value of said counter at the leading edge of the TO-pulse output through said switch means;

a second latch which latches a counter value of said counter at the trailing edge of the TO-pulse output through said switch means;

a third latch which latches a counter value of said counter at the leading edge of the FRO-pulse output through said switch means;

a fourth latch which latches a counter value of said counter at the trailing edge of the FRO-pulse output through said switch means;

a first subtracter which subtracts the output of said first latch from the output of said third latch;

a second subtractor which subtracts the output of said second latch from the output of said fourth latch; and an averaging circuit which calculates the average value of the outputs of said first and second subtracters as data corresponding to the time interval between the TO-pulse and the FRO-pulse of each of said guidance beam and each of said test signal.

9. A microwave landing system according to claim 8, further including a fifth latch which latches the output of said averaging circuit at the trailing edge of each of said FRO-gate pulse.

10. A microwave landing system according to claim 1, wherein said verification means comprises a first subtracter which subtracts a predetermined reference value from each of the measured first and second time intervals outputted by said measurement means, and a comparator which compares the output of said first subtracter with a predetermined allowable tolerance value and outputs an alarm signal when the output of said first subtracter is larger than said predetermined allowable tolerance value and outputs a normal signal when that output is smaller than the same.

11. A microwave landing system according to claim 1, wherein said verification means includes means for verifying the normalcy of said microwave landing system when the measured second time interval is within a predetermined tolerance range, and means for verifying the abnormalcy of said monitor circuit when the measured first time interval is within a preset tolerance range.

12. A microwave landing system according to claim 2, wherein said timer means comprises first and second timers which respectively measure the time period during which abnormality in said microwave landing system and said monitor circuit continue, and means for supplying from said first and second timers, in an alternating manner, a signal indicative of abnormality determined on the basis of the measured first and second time intervals obtained by said measurement means.

13. A microwave landing system according to claim 12, wherein said first and second timers each comprise an up/down counter which has an up terminal and a down terminal, to which are respectively supplied a signal indicative of an abnormality and a signal indicative of a normalcy.

14. A microwave landing system according to claim 1, wherein said switch means comprises two differential amplifiers which respectively amplify the output of said conversion means and said test signal, a multiplexer which time-serially generates the outputs from said two differential amplifiers, and a comparator which compares the output of said multiplexer with a predetermined reference level for shaping the multiplexer output pulse.

15. A microwave landing system according to claim 14, further comprising means for setting said reference level at a level which is 3 dB lower than the peak of the output of said conversion means obtained in the past scanning.

16. A microwave landing system comprising:
   scan means for reciprocally scanning a predetermined region with a guidance beam;
   an antenna located at a predetermined position for receiving said guidance beam;
   pulse generating means for generating a pair of test pulses with a time interval therebetween which is determined by the position of said antenna;
   switch means for outputting a TO-pulse and a FRO-pulse received by said antenna in response to a TO-scan and a FRO-scan of said guidance beam and for outputting said pair of test pulses during a dead time period of guidance beam scanning during which said antenna receives no electromagnetic waves indicative of meaningful information for guidance;
   monitor means for measuring a measured time interval between said pair of test pulses; and
   monitor verification means for verifying normalcy of said monitor means on the basis of said measured time interval.

17. A microwave landing system according to claim 16, wherein said monitor means further measures a time interval between the TO-pulse and the FRO-pulse from said antenna to verify the normalcy of the guidance beam.

18. A microwave landing system for use in radiating a guidance beam, said microwave landing system comprising:
   scan means for reciprocally scanning a predetermined region with said guidance beam utilizing a TO-scan and a FRO-scan in a time division fashion;
   a field monitor antenna, located at a predetermined position within said predetermined region for receiving said guidance beam at said predetermined position, for alternatingly generating a TO-pulse and a FRO-pulse each time said guidance beam is received by said field monitor antenna during said TO-scan and said FRO-scan, respectively, said TO-pulse and said FRO-pulse generated with a prescribed time interval therebetween and followed by a following TO-pulse and a following FRO-pulse with a dead time between said FRO-pulse and said following TO-pulse;
   conversion means for converting a received signal into a video signal;
   test signal generating means for generating, during said dead time, a test signal comprised of a quasi TO-pulse and a quasi FOR-pulse with a first time interval therebetween, said first time interval longer than said prescribed time interval; and
   a monitor circuit, coupled to said conversion means and to said test signal generating means, for monitoring said video signal and said test signal to determine whether said microwave landing system is operating normally.

19. A microwave landing system according to claim 18, further comprising timer means for determining whether said monitor circuit has detected an abnormality in said microwave landing system or in said monitor circuit over a time period greater than a predetermined time period.

20. A microwave landing system according to claim 19, further comprising stopping means for stopping operation of said microwave landing system when said timer means determines that abnormality has been detected over a time period greater than said predetermined time period.

21. A microwave landing system according to claim 20, wherein said timer means comprises first and second timers which respectively measure time periods during which abnormality in said microwave landing system and said monitor circuit continue; and
   generation means for operation from said first and second timers, in an alternating manner, signals indicative of abnormality determined on the basis of said first time interval and said prescribed time interval.

* * * * *